United States Patent [19]

MacDonald et al.

[11] Patent Number: 5,685,612
[45] Date of Patent: Nov. 11, 1997

[54] SEAT CENTER PIVOT BRACKET ASSEMBLY

[75] Inventors: Daniel G. MacDonald, Harrison Township; Mark G. Stanisz, Waterford, both of Mich.

[73] Assignee: Lear Corporation, Southfield, Mich.

[21] Appl. No.: 658,006

[22] Filed: Jun. 4, 1996

[51] Int. Cl.$^6$ ............................................ B60N 2/02
[52] U.S. Cl. ............................ 297/378.1; 297/440.1; 248/503.1
[58] Field of Search .................. 297/378.13, 378.12, 297/378.1, 463.1, 354.1, 440.1, 440.15, 440.2; 296/65.1; 248/503, 503.1

[56] References Cited

U.S. PATENT DOCUMENTS

| | | | |
|---|---|---|---|
| 3,262,725 | 7/1966 | Ballantyne | 297/378.13 X |
| 3,410,600 | 11/1968 | Thorpe | 297/378.13 X |
| 3,781,062 | 12/1973 | Farmer et al. | 297/378.13 |
| 4,708,385 | 11/1987 | Kondo | 297/378.13 X |
| 4,759,583 | 7/1988 | Schrom et al. | 297/335 X |
| 4,909,571 | 3/1990 | Vidwans et al. | 297/378.13 X |
| 4,971,379 | 11/1990 | Rumpel et al. | 248/503.1 X |
| 5,015,026 | 5/1991 | Mouri | 297/378.1 X |
| 5,263,763 | 11/1993 | Billette | 297/378.13 X |

*Primary Examiner*—Milton Nelson, Jr.
*Attorney, Agent, or Firm*—Brooks & Kushman P.C.

[57] ABSTRACT

An apparatus is provided for pivotally securing first and second seat back frames with respect to a vehicle body. The first and second seat back frames include first and second pivot pins extending therefrom, respectively. The apparatus includes a bracket attachable to the vehicle body and having first and second slots formed therein for rotatably supporting the first and second pivot pins, respectively. First and second spring-biased cam latches are pivotally connected to the bracket adjacent the first and second slots, respectively, and are pivotable between unlatched and latched positions. The pivot pins cammingly engage the respective cam latch for pivoting the cam latch to allow insertion of the respective pivot pin into the respective latch whereupon the cam latch returns to the latched position as a result of the spring bias in order to secure the respective pivot pin within the respective slot.

9 Claims, 4 Drawing Sheets

SEAT CENTER PIVOT BRACKET ASSEMBLY

TECHNICAL FIELD

The present invention relates to vehicle seats, and more particularly to an apparatus for pivotally securing split-folding rear seat back frames with respect to a vehicle body.

BACKGROUND ART

Typically, installation of seat back frames into a vehicle is a complex, and sometimes awkward process. Conventionally, a center pivot bracket is bolted to the vehicle body, and the seat back frames are bolted to the bracket for pivoting. Bolting of the various components occurs either during installation or prior to installation. Of course, the bolting operation is an added manufacturing cost.

In one embodiment, a stamped metal bracket is secured to the vehicle body and includes a saddle portion for receiving a pin which extends from one of two seat back frames. The saddle opens upwardly to receive the pin as the seat back frame is inserted. The other of the seat back frames includes an aperture for cooperation with the pin extending from the first seat back frame. The assembly process requires that both seat back frames be inserted simultaneously onto the saddle in a manner such that the pin may be inserted into the aperture. As the two seat back frames are simultaneously loaded onto the saddle, a latch mechanism extending from one of the seat back frames must be lined up with and engaged with a boss extending from the support bracket in order to secure the two seat back frames to the bracket.

Ergonomically, it can be very difficult to simultaneously load the two back frames, insert the pin from one back frame into the aperture of the other back frame, and line up the latch mechanism with the boss on the pivot bracket for completing the assembly. Typically, seat trim and foam portions can obstruct the view of the installer, which results in a blind-attachment assembly operation. This blind attachment can substantially slow the vehicle assembly process, and increase manufacturing costs. Furthermore, providing the latch mechanism on one of the seat back frames increases manufacturing costs for the seat back frame.

It is desirable to provide a seat back frame attachment mechanism which does not require simultaneous loading of the back frames.

It is further desirable to provide a seat back frame attachment mechanism which does not require blind insertion of a pin extending from one seat back frame into an aperture formed in the other seat back frame as the two seat back frames are simultaneously loaded into the vehicle.

It is also desirable to provide a seat back frame attachment mechanism which does not require an attachment latch extending from one of the back frames for engaging the support structure.

DISCLOSURE OF THE INVENTION

The present invention overcomes the above-referenced shortcomings of prior art seat support assemblies by providing a center pivot bracket assembly which includes a pair of spring-loaded cam latches pivotally secured to a bracket so that the seat back frames may be independently installed in the vehicle, and pins extending from the respective back frames can be seated in a respective slot formed in the bracket and secured by the cam latch. In this manner, the seat back frames are easily pivotally connected with respect to the vehicle body. No blind alignment of back frame components or bracket components is necessary.

More specifically, the present invention provides an apparatus for pivotally securing first and second seat back frames with respect to a vehicle body. The first and second seat back frames include first and second pivot pins extending therefrom, respectively. The apparatus includes a bracket attachable to the vehicle body and having first and second slots formed therein for rotatably supporting the first and second pivot pins, respectively. First and second spring-biased cam latches are pivotally connected to the bracket adjacent the first and second slots, respectively, and are pivotable between unlatched and latched positions. The pivot pins cammingly engage the respective cam latch for pivoting the cam latch in order to secure the respective pivot pin within the respective slot.

Accordingly, an object of the present invention is to provide an apparatus for pivotally securing seat back frames with respect to a vehicle which does not require simultaneous loading of the back frames.

A further object of the present invention is to provide an apparatus for pivotally securing first and second seat back frames with respect to a vehicle which does not require engagement of a pin extending from one back frame with an aperture formed in the other back frame.

A further object of the present invention is to provide an apparatus for pivotally securing first and second seat back frames with respect to a vehicle body which does not require a latch mechanism as part of a back frame assembly for engaging a portion of the support bracket, and which is configured to allow easy removal of the seat back frames for servicing.

The above objects and other objects, features, and advantages of the present invention are readily apparent from the following detailed description of the best modes for carrying out the invention when taken in connection with the accompanying drawings.

DETAILED DESCRIPTION OF THE PREFERRED EMBODIMENT

Figure 1:
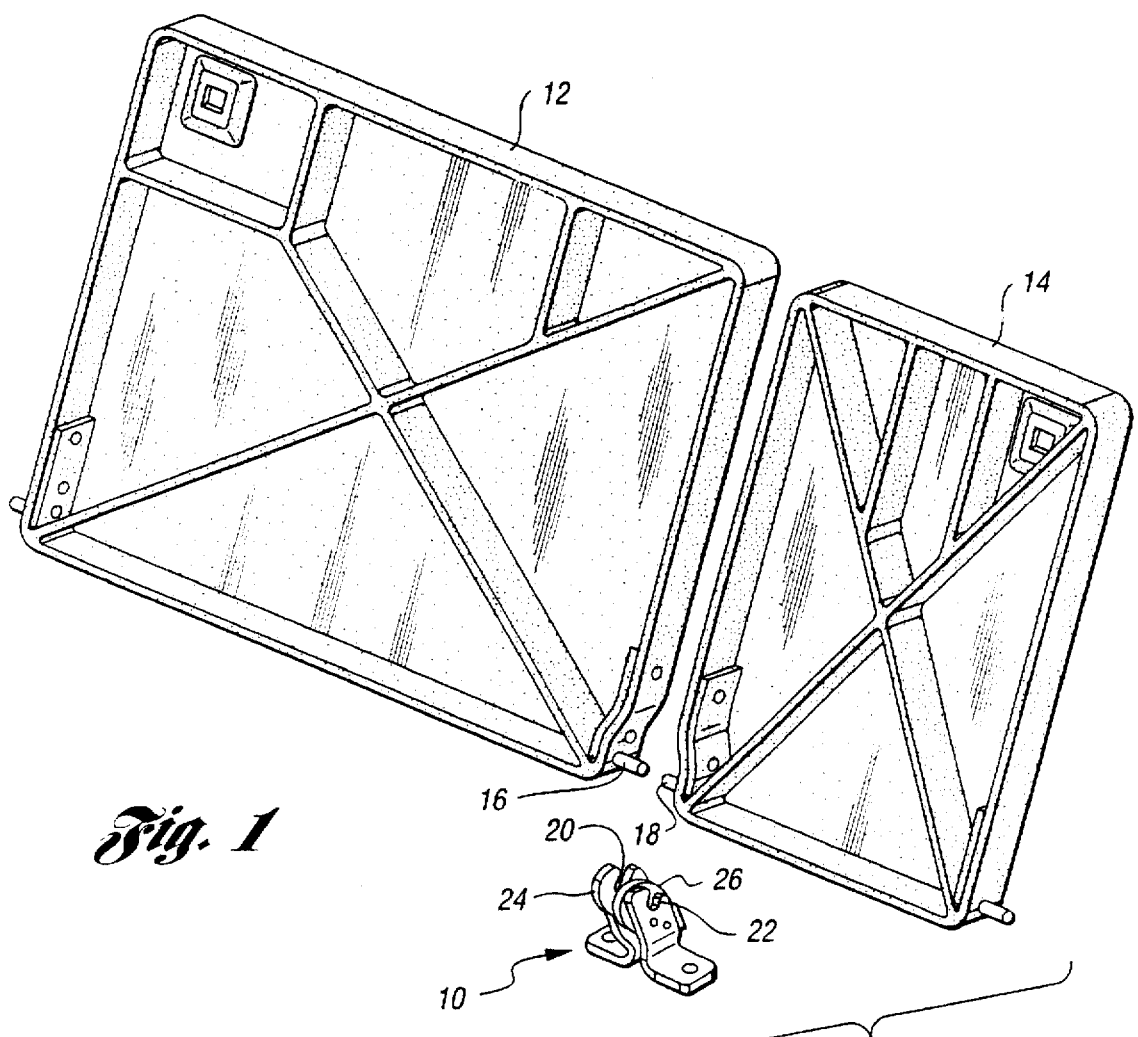
FIG. 1 shows an exploded perspective environmental view of a center pivot bracket with first and second seat back frames in accordance with the present invention.
Figure 2:
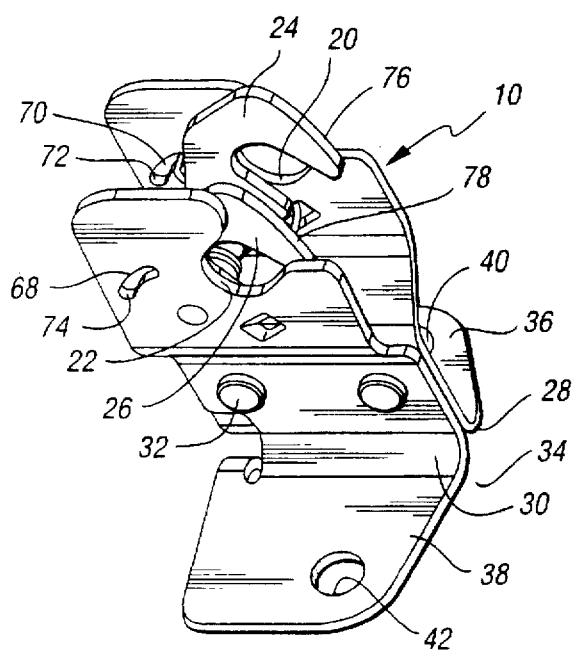
FIG. 2 shows a perspective view of a center pivot bracket assembly in accordance with the present invention.
Figure 3:
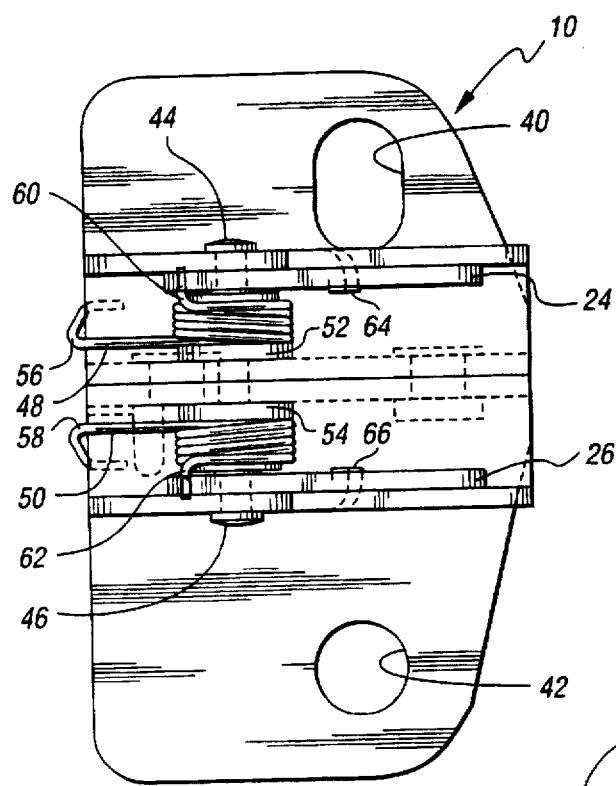
FIG. 3 shows a top plan view of the center pivot bracket assembly shown in FIG. 2.

FIG. 1 shows a partially exploded, perspective, environmental view of a center pivot bracket assembly 10 for pivotally securing first and second seat back frames 12,14 in a vehicle. The first and second seat back frames 12,14 include first and second pivot pins 16,18 extending therefrom, respectively. The first and second pivot pins 16,18 are engageable within the slots 20,22 formed in the center pivot bracket assembly 10, and are secured in position by the first and second cam latches 24,26.

The center pivot bracket assembly 10 is more clearly shown in FIGS. 2–5. The center pivot bracket assembly 10 includes first and second support members 28,30 joined together by a pair of attachment pins 32,34. The first and second support members 28,30 include attachment flanges 36,38 extending therefrom with attachment apertures 40,42 formed therethrough for attachment to the vehicle. First and second rivets 44,46 pivotally secure the first and second cam latches 24,26 to the first and second support members 28,30, respectively. The rivets 44,46 further include rotary springs 48,50 disposed thereon for spring-biasing the first and second cam latches 24,26, respectively. Rivet shoulders 52,54 secure the rotary springs 48,50 on the rivets 44,46, respectively.

Figure 4:
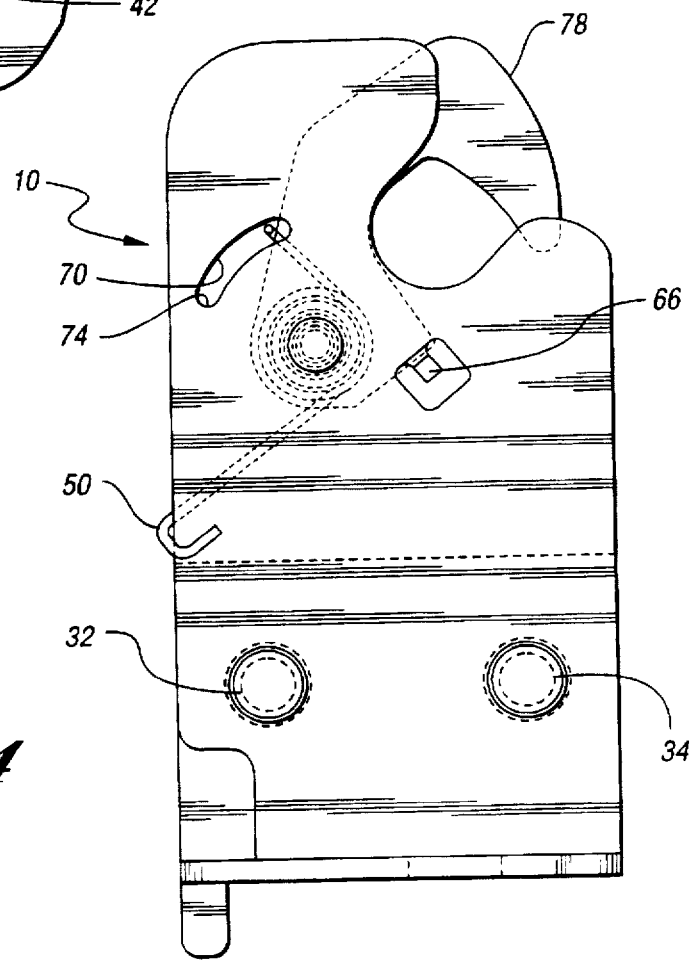
FIG. 4 shows a side view of the center pivot bracket assembly shown in FIG. 2.
Figure 5:
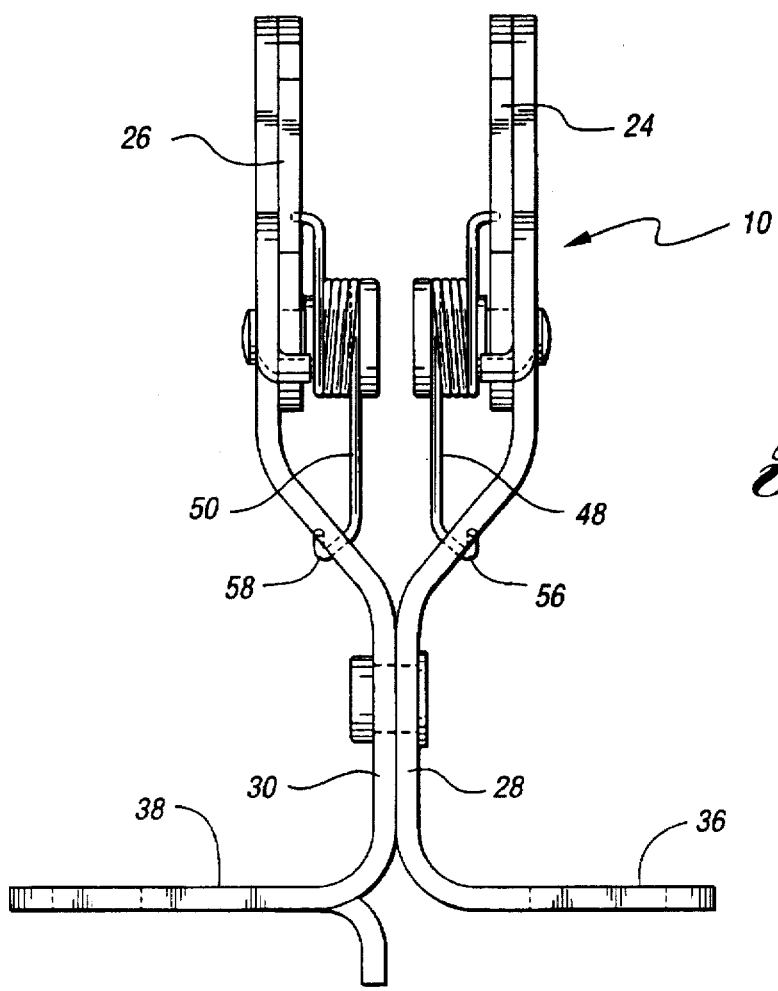
FIG. 5 shows a front view of the pivot bracket assembly shown in FIG. 2.

The rotary springs 48,50 each include a first end portion 56,58 which loops around the respective support member 28,30 for rotary support of the spring. The opposite ends 60,62 of the rotary springs 48,50 engage the respective cam latch 24,26 for biasing the cam latches 24,26 from an unlatched position in which the cam latch 24,26 is cleared away from the respective slot 20,22, toward a latched position in which the cam latches 24,26 overhang the slots 20,22 for securing the pivot pins 16,18 of the seat back frames 12,14 within the slots 20,22. Inwardly extending stop members 64,66 engage the cam latches 24,26 when in the latched position, as shown in FIG. 4, to prevent further movement of the latches 24,26. Clearance slots 68,70 are formed in the support members 28,30 to allow travel of the second spring ends 60,62 therein. When the spring ends 60,62 bottom out against the rear end 72,74 of the slots 68,70, the cam latches 24,26 are in the fully unlatched position and cannot be pivoted further in that direction.

Each cam latch 24,26 includes an outwardly facing cam surface 76,78 of decreasing radius from the center of the rivets 44,46. Accordingly, as the first and second pivot pins 16,18 of the seat back frames 12,14 are forced against the cam surfaces 76,78 of the cam latches 24,26, the pivot pins 16,18 travel along the cam surfaces 76,78, respectively, thereby pivoting the cam latches 24,26 from the latched position to the unlatched position to allow entry of the pivot pins 16,18 within the respective slot 20,22. Once the pivot pins 16,18 have seated within the slots 20,22, the rotary springs 48,50 force the cam latches 24,26 to return to the latched position, wherein the pivot pins 16,18 are secured and rotatably supported within the slots 20,22.

Figure 6:
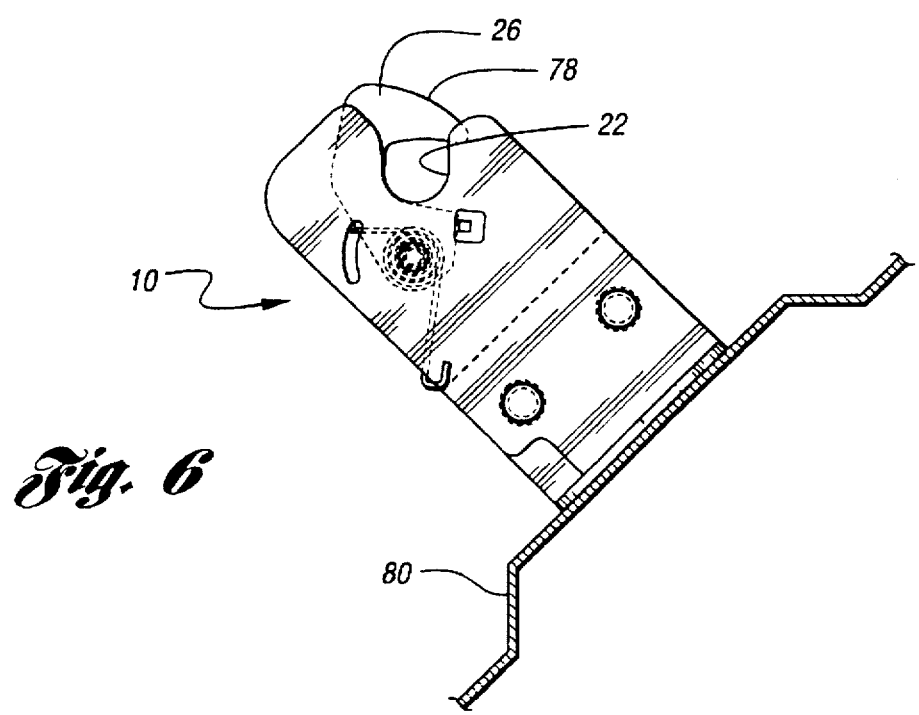
FIG. 6 shows a cut-away side view of a center pivot bracket assembly secured to a vehicle body mount in accordance with the present invention.

As shown in FIG. 6, the center pivot bracket assembly 10 is preferably secured to a body mount 80 in a manner in which the slots 20,22 open vertically upward for ease of assembly.

In this configuration, the installer may easily snap the first and second seat back frames 12,14 into position within the pivot bracket assembly 10 by forcing each pivot pin 16,18 into the slot 20,22 against the rotary spring-bias of the respective cam latch 24,26. No alignment of apertures or other mechanisms is required in this assembly. The installer merely pushes the seat back frames 12,14 down against the cam surfaces 76,78, which causes the cam latches 24,26 to retract, and the cam latches 24,26 return to the latched position once the pivot pins 16,18 have seated within the slots 20,22.

Figure 7:
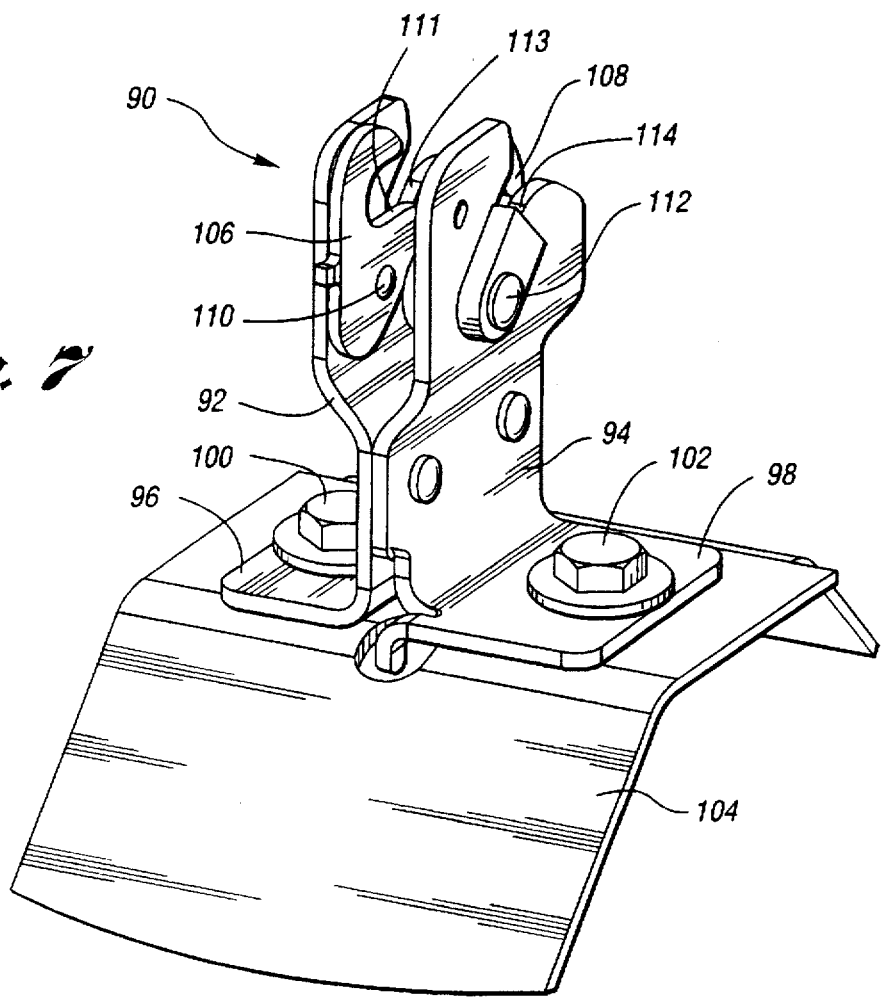
FIG. 7 shows a perspective view of an alternative embodiment of a center pivot bracket assembly in accordance with the present invention.
Figure 8:
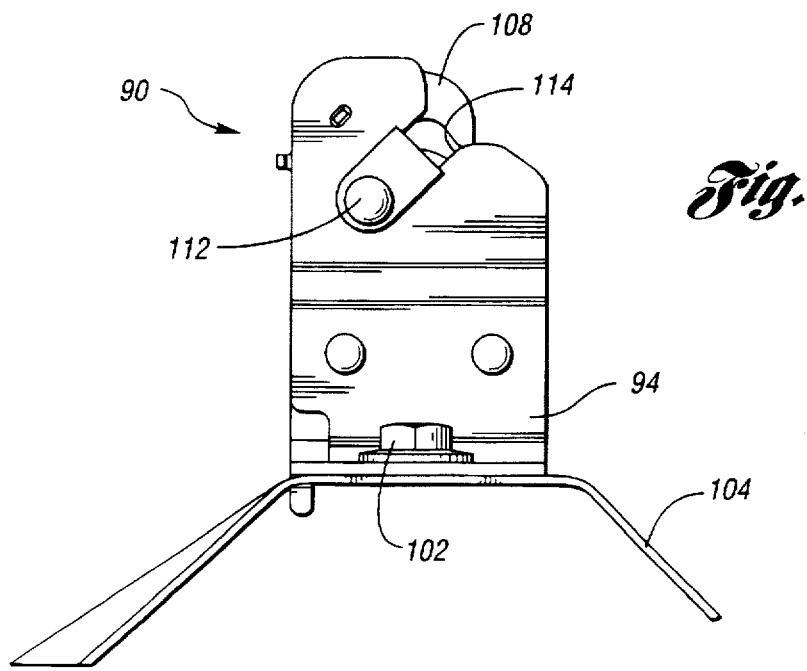
FIG. 8 shows a side view of the center pivot bracket assembly of FIG. 7.

An alternative embodiment of the present invention is illustrated in FIGS. 7–8. In this embodiment, the center pivot bracket assembly 90 includes first and second support members 92,94 secured by attachment flanges 96,98 and bolts 100,102 to the body mount 104. Cam latches 106,108 are pivotally secured to the first and second support members 92,94 by the rivets 110,112, respectively. A spring-bias is provided (not shown) for initially holding the cam latches 106,108 in the unlatched position. The cam latches 106,108 each include a cam surface 111 formed thereon for cammingly engaging the pivot pins 16,18 (shown in FIG. 1) of the seat back frames.

When the pivot pins engage the cam surfaces 111, the cam latches 106,108 are caused to rotate from the unlatched position toward the latched position, wherein the pivot pins are secured within the slots 113,114. In this embodiment, the spring (not shown) would be secured to the support members 92,94 below the rivets 110,112 such that the cam latches 106,108 will be spring-biased to the unlatched position when in the unlatched position, and will be spring-biased toward the latched position once the cam latch pivots so that the springs cross the central axes of the rivets 110,112. FIG. 8 illustrates a side view of the center pivot bracket assembly 90 with the cam latch 108 shown in the latched position.

In this configuration, the pivot pins 16,18 of the seat back frames are inserted into the slots 112, 114, and engage the camming surface 111 in order to pivot the cam latches 106,108 against the spring-bias until the spring load toggles over the rivets 110,112, at which point the spring biases the cam latches 106,108 toward the latched position, such that the pivot pins will be engaged and secured within the slots 113,114.

While the best modes for carrying out the invention have been described in detail, those familiar with the art to which this invention relates will recognize various alternative designs and embodiments for practicing the invention within the scope of the appended claims.

What is claimed is:

1. An apparatus for pivotally securing first and second seat back frames with respect to a vehicle body, the first and second seat back frames having first and second pivot pins extending therefrom, respectively, the apparatus comprising:

a bracket attachable to the vehicle body and having first and second slots formed therein for rotatably receiving the first and second pivot pins, respectively; and first and second spring-biased cam latches pivotally connected to said bracket adjacent said first and second slots, respectively, and pivotable between unlatched and latched positions, whereby each pivot pin cammingly engages the respective cam latch for pivoting the respective cam latch as the pivot pin is inserted into the respective slot, and said spring-bias maintains the cam latch in the latched position in order to secure the respective pivot pin within the respective slot.

2. The apparatus of claim 1, wherein each said cam latch includes a cam surface engageable with the respective pivot pin, whereby the respective pivot pin may engage the respective cam surface and travel along the cam surface for pivoting the cam latch for attachment.

3. The apparatus of claim 1, wherein said bracket comprises first and second support members secured together, each said support member having an attachment flange extending therefrom for attachment to the vehicle body.

4. The apparatus of claim 3, further comprising first and second rivets pivotally securing said first and second cam latches to said first and second support members, respectively, and first and second springs biasing said first and second cam latches, respectively, toward the latched position.

5. A vehicle seat attachment apparatus for use in a vehicle having a vehicle body, comprising:

first and second seat back frames, said back frames having first and second pivot pins extending therefrom, respectively;

a bracket attachable to the vehicle body and having first and second slots formed therein for rotatably receiving the first and second pivot pins, respectively; and first and second spring-biased cam latches pivotally connected to said bracket adjacent said first and second slots, respectively, and pivotable between unlatched and latched positions, whereby each pivot pin cammingly engages the respective cam latch as the pivot pin is inserted into the respective slot, and said spring-bias urges the respective cam latch toward the latched position in order to secure the respective pivot pin within the respective slot.

6. The apparatus of claim 5, wherein each said cam latch includes a cam surface engageable with the respective pivot pin, whereby the respective pivot pin may engage the respective cam surface and travel along the cam surface for pivoting the cam latch as the pivot pin is inserted into the respective slot.

7. The apparatus of claim 5, wherein said bracket comprises first and second support members secured together, each said support member having an attachment flange extending therefrom for attachment to the vehicle body.

8. The apparatus of claim 7, further comprising first and second rivets pivotally securing said first and second cam latches to said first and second support members, respectively, and first and second springs biasing said first and second cam latches, respectively, toward the latched position.

9. An apparatus for pivotally securing first and second seat back frames with respect to a vehicle body, the first and second seat back frames having first and second pivot pins extending therefrom, respectively, the apparatus comprising:

a bracket attachable to the vehicle body comprising first and second support members secured together, each support member having a slot formed therein for rotatably supporting the first and second pivot pins, respectively, and each support member having an attachment flange extending therefrom for attachment to the vehicle body;

first and second spring-biased cam latches pivotally connected to said bracket adjacent said slots, respectively, and pivotable between unlatched and latched positions, wherein each said cam latch includes a cam surface engageable with the respective pivot pin, whereby the respective pin may engage the respective cam surface and travel along the cam surface for pivoting the cam latch as the respective pivot pin enters the respective slot, whereupon the respective cam latch pivots to the latched position as a result of the spring-bias in order to secure the respective pivot pin within the respective slot.

* * * * *